(12) United States Patent
Berns et al.

(10) Patent No.: US 8,185,137 B2
(45) Date of Patent: May 22, 2012

(54) INTENSITY-BASED MAPS

(75) Inventors: Adam T. Berns, Bellevue, WA (US);
James E. Allard, Seattle, WA (US);
Nicholas C. Baker, Cupertino, CA (US);
Todd E. Holmdahl, Redmond, WA (US); Oliver R. Roup, Seattle, WA (US); David H. Sloo, Menlo Park, CA (US); Curtis G. Wong, Medina, WA (US); Dawson Yee, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1053 days.

(21) Appl. No.: 11/767,715

(22) Filed: Jun. 25, 2007

(65) Prior Publication Data

US 2008/0318597 A1 Dec. 25, 2008

(51) Int. Cl.
*H04Q 7/20* (2006.01)
(52) U.S. Cl. ........................ 455/456.5; 704/265; 701/209
(58) Field of Classification Search .................. None
See application file for complete search history.

(56) References Cited

U.S. PATENT DOCUMENTS

| | | | |
|---|---|---|---|
| 6,879,835 B2* | 4/2005 | Greene et al. | 701/201 |
| 6,934,684 B2* | 8/2005 | Alpdemir et al. | 704/265 |
| 2003/0036848 A1* | 2/2003 | Sheha et al. | 701/209 |

* cited by examiner

*Primary Examiner* — Kent Chang
*Assistant Examiner* — Kashif Siddiqui
(74) *Attorney, Agent, or Firm* — Lee & Hayes, PLLC

(57) ABSTRACT

The claimed subject matter relates to a first architecture that can create an intensity map based upon intensity scores, and to a second architecture that can provide intensity scores and can request and receive the intensity map. Intensity scores can relate to an approval or a level of satisfaction of a current location of a user and can be conveniently provided, in some cases with a single keystroke (e.g., 0-9 from a conventional cell phone keypad) by, say, mobile device users. Numerous intensity scores can be received and aggregated to produce an intensity map of a given area or region. Portions of the intensity map can be provided to requesting devices, potentially filtered based upon a variety of criteria. As a result, the intensity map can provide in substantially real-time a visual indication of locations or entities that might be interesting to explore.

20 Claims, 12 Drawing Sheets

INTENSITY-BASED MAPS

BACKGROUND

Conventionally, planning an outing, be it a day at a theme park, a night out on the town, or something else, is typically a multi-step process. First, an individual must decide what types of activities are suitable based upon her own particular interests or in connection with her friends. Next, the individual must locate suitable entities or venues for those activities, commonly with the aid of web-based mapping utilities. And finally, upon arrival, the individual is essentially committed even if the activity is not what was expected because most people do not go to the trouble of contingency plans for a relaxing night out or other outing. Essentially, no amount of painstaking research and arduous planning can be a complete substitute for actually visiting the location, and even a very satisfactory visit, say, last week may not be indicative of a good time this week due to a variety of factors that could change over time.

As an alternative to planning outings, many individuals simply frequent locales that are commonly exciting or festive with the hope that something interesting will arise. In the latter case, the individual is largely resigned to the fact that the odds of having a good time are potentially remote. Moreover, the potential to overlook an interesting event or entity is highly likely. For example, the individual who has chosen a particular locale may wander all around the interesting location without ever discovering and/or noticing it.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one aspect thereof, comprises a computer-implemented architecture for creating an intensity map. The intensity map can be a map of a given area or region that can be overlaid, embedded, and/or implemented with intensity scores relating to various locations within the scope of the area or region of the map. The intensity scores can, e.g., indicate an approval or level of satisfaction for various locations and/or entities such as business establishments or venues located at those locations. The intensity scores can be aggregated in substantially any suitable manner to produce an overall intensity score for any given location.

The intensity map can be constructed and/or updated in real time based upon receipt of intensity scores. According to an aspect of the claimed subject matter, the intensity map can be filtered to display intensity scores applicable to only a certain type of entity (e.g., filtered to display only restaurants or night clubs, etc.). In addition, the intensity map can be filtered based upon other criteria as well. For example, the intensity map can be filtered to display only intensity scores from mobile devices that have an association (e.g. a trusted third party such as one that is included in a friend list or the like) with the requesting device. Additionally or alternatively, the intensity map can be filtered based upon demographics, history, or other statistics or stochastic information. For instance, the requesting device can request an intensity map that includes real-time intensity scores from "people like me". That is, intensity scores can be displayed from mobile devices employed by users who share characteristics such as profiling, age, gender, likes, interests and so forth with the user of the requesting device.

In accordance with another aspect of the claimed subject matter, a second computer-implemented architecture for receiving the intensity map can be provided. The second architecture can aggregate preferences such as preferences relating to a type of intensity map desired, and transmit or solicit a request for the intensity map based upon the preferences. The second architecture can also transmit intensity scores to a remote system as well as receive location-based services (LBS) from the remote system.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
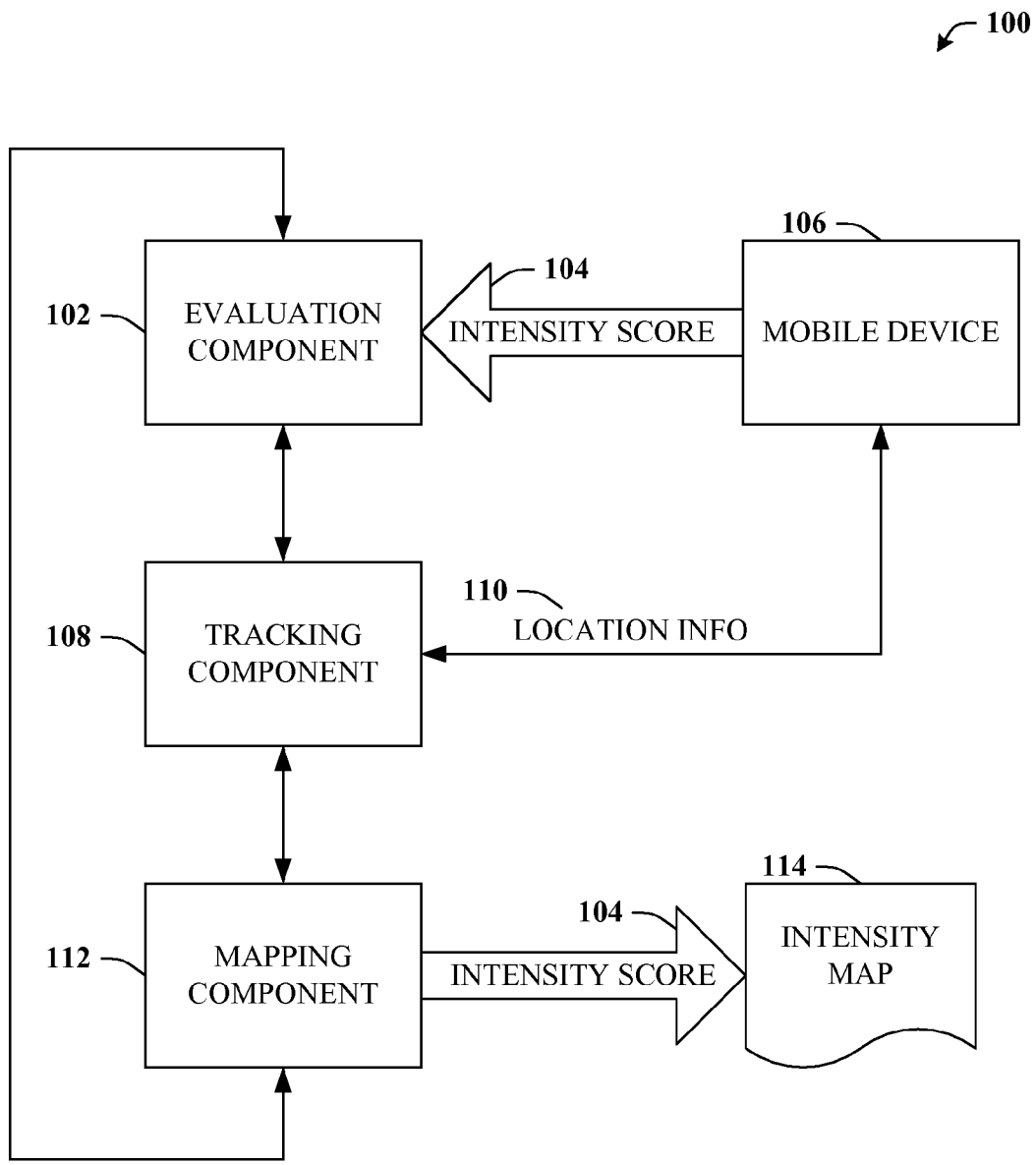
FIG. 1 is a block diagram of a computer implemented system that can create an intensity map.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips ... ), optical disks (e.g., compact disk (CD), digital versatile disk (DVD) ... ), smart cards, and flash memory devices (e.g. card, stick, key drive ... ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawing, with reference initially to FIG. 1, a computer implemented system 100 that can create an intensity map, is depicted. Generally, the system 100 can include an evaluation component 102 that can receive an intensity score 104 from, e.g. a mobile device 106. One example of a mobile device 106 can be a cellular phone, however, it is to be appreciated that many other examples exist that are also applicable to the claimed subject matter. For example, the mobile device 106 can be any of a wide range of portable devices such as a Personal Digital Assistant (PDA), key fob, a watch, an organizer, a digital media player/recorder, a digital camera, a pager, an electronic toy or game, a tablet, etc. It is also to be appreciated that aspects of the intensity score 104 can be dependent upon the type of mobile device 106.

For instance, the intensity score 104 can be as simple as a Boolean variable (e.g., 1 or 0 to indicate a simple rating such as like/dislike, thumbs up/thumbs down, approve/disapprove ... ) that can be selected by less sophisticated mobile devices 106 and/or mobile devices 106 with a limited user interface such as a key fob or digital media player. According to other aspects, the intensity score 104 can be a rating from 0-9 indicating various levels of satisfaction, interest, and/or approval that can be conveniently selected by way of a typical cellular phone keypad. In yet another aspect, the intensity score 104 can be even more advanced, indicating detailed scoring and/or ranking across a variety of categories as well as including text or media commentary. Hence, the complexity and/or level of detail included in the intensity score 104 need only be constrained by the capabilities (e.g., hardware, software, user interface) of the mobile device 106 that provides the intensity score 104. However, even very sophisticated mobile devices 106 need not utilize complex intensity score 104 formats. For example, a simple Boolean value intensity score 104 can be supplied even though the associated mobile device 106 might be capable of much more sophisticated intensity score 104 formats.

The system 100 can also include a tracking component 108 that can determine a location of the mobile device 106. In addition, the tracking component 108 can exchange location information 110 with the mobile device 106. The tracking component 108 can be further described with reference to FIG. 2, which can now be referenced prior to continuing the discussion of FIG. 1.

Figure 2:
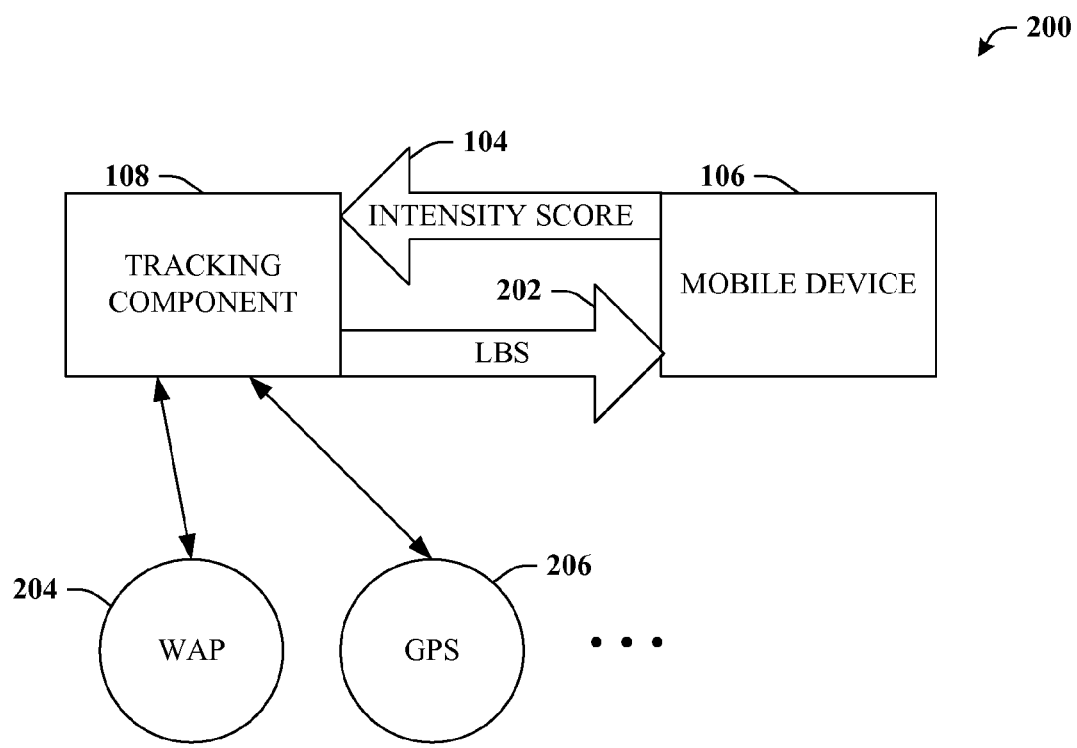
FIG. 2 illustrates a block diagram of a system that can determine a location and/or can communicate location information.

FIG. 2 illustrates a system 200 that determines a location and/or communicates location information. As with FIG. 1, the tracking component 104 can receive an intensity score 104 that originates from the mobile device 106 or be appraised of the receipt of the intensity score 104 such as, e.g. by way of the evaluation component 102. The tracking component 104 can provide a location-based service (LBS) 202 to the mobile device 106. For example, often even mobile devices 106 that include a GPS chip must still pay for the service of enabling the use of GPS service. The tracking component 108 can subsume, subsidize, or render for free location information to the mobile device 106 (e.g., as a LBS). Similarly, the location of the mobile device 106 can be established by way of a Wireless Application Protocol (WAP). For instance, radiolocation and/or trilateration employing signal strength measures at various stationary transceivers by well-known means can be employed to pinpoint the location of the mobile device 106.

In addition to providing location information to the mobile device 106, the LBS 202 can also provide additional information such as overlaying static or dynamic maps; providing a listing of, say, nearby Italian restaurants or nearby sporting goods stores; indicating sales or advertisements in proximity to the mobile device 106; indicating proximity to another mobile device 106; and so on. It is to be appreciated that other examples of LBS 202 exist and are to be included in the scope of the claimed subject matter. It is to be further appreciated that LBS 202 can be provided substantially free of charge such as in exchange for the intensity score 104, which may or may not relate to the location for which the LBS 202 is provided. For example, a mobile device 106 might periodically supply an intensity score 104 at particular locations, yet request an LBS 202 at a different location.

Turning back to FIG. 1, the system 100 can also include a mapping component 112 that can apply the intensity score 104 to an intensity map 114. For example, the intensity map 114 can be a global map, but in other cases, the intensity map 114 can be a map of particular regions of a global map such as countries, states, provinces, cities, towns, municipalities, boroughs, neighborhoods, districts, and so forth. Irrespective of the scale of the intensity map 114, the mapping component 112 can apply the intensity score 104 at coordinates of the intensity map 114 associated with the location of the mobile device 106 at the time the intensity score 104 was issued and/or received. Thus, the vote or ranking as to a particular aspect of the location included in the intensity score 104 can be applied to the intensity map 114. In particular, the intensity map 114 can be color coded (or grey-scale coded) to denote aggregated intensity scores 104 from numerous mobile devices 106, and dynamically updated in real time as new intensity scores 104 are received.

Figure 3:
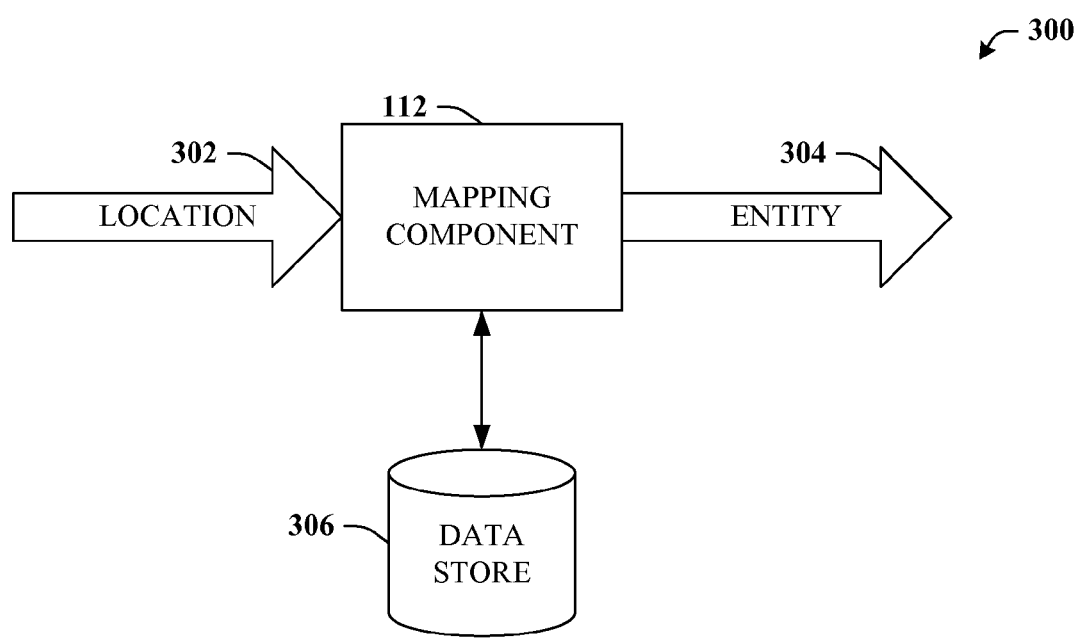
FIG. 3 depicts a block diagram a computer-implemented system that illustrates additional features of the mapping component.

While still referring to FIG. 1, but turning also to FIG. 3, a computer-implemented system 300 that illustrates additional features of the mapping component 112 is depicted. In accordance with an aspect of the claimed subject matter, the mapping component 112 can also associate the location 302 of the mobile device 106 at the time an intensity score 104 was transmitted and/or received with a particular entity 304, such as a particular restaurant, venue, business, or establishment. For example, while intensity scores 104 can include detailed information about a location, intensity scores 104 can also be very brief or simple and provided by pressing a single button on a mobile device 106 (e.g., 0-9 on a cell phone) to, e.g. encourage convenient and prolific use. Thus, in the latter case, as one example, the mapping component 112 can associate the location 302 of a mobile device 106 with the entity 304 that exists at that location 302.

In one aspect, the mapping component 112 can access a data store 306 that can include map data and location information such as longitude/latitude coordinates as well as business and residential address information. Any or all data included in the data store 306 can be relationally linked to provide for a variety of views based upon, e.g. postal codes, access prefixes, directory assistance listings/categorizations, etc. It is also to be appreciated that the data store 306 can include various other information in addition to map data and location information, as will be discussed in more detail infra.

Figure 4:
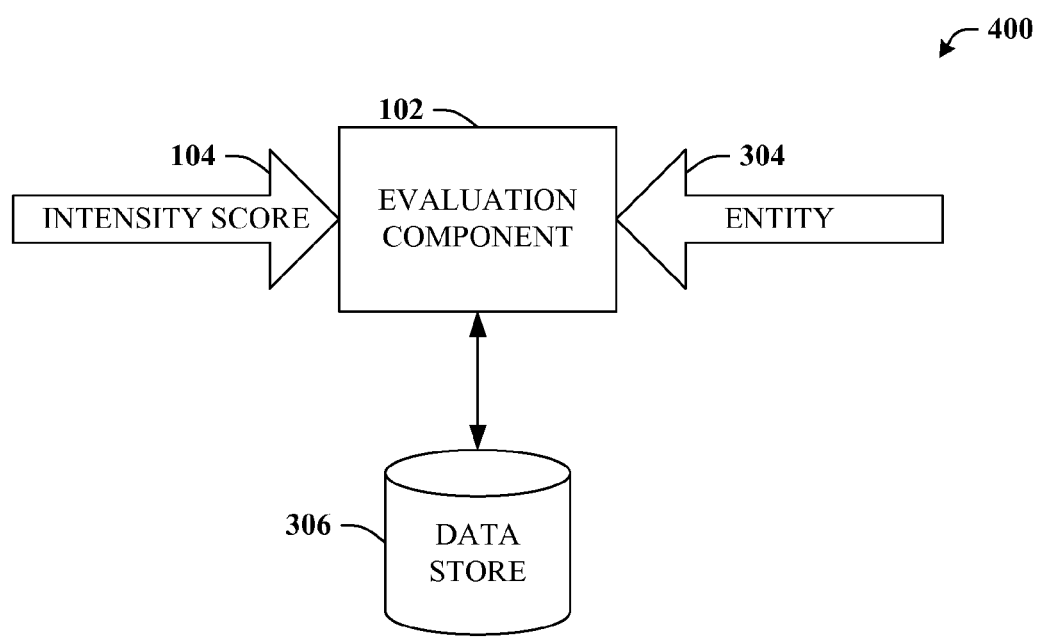
FIG. 4 illustrates a block diagram of an example system that can evaluate an intensity score based upon a type of entity.

Furthermore, the evaluation component 102 can interpret the intensity score 104 based upon a type of the entity 304, as depicted in FIG. 4. FIG. 4 shows an example system 400 that can evaluate an intensity score 104 based upon a type of entity 304. For example, if the mapping component 112 associates the location 302 with a restaurant, the evaluation component 102 can interpret the received intensity score 104 based upon that particular type of entity 304 (e.g. a restaurant). Accordingly, the evaluation component 102 can determine or infer that the intensity score 104 relates to, e.g., the atmosphere, the service, the food, and/or all of the above. In addition, the evaluation component 102 can interpret the intensity score 104 based upon a time in which the intensity score was received. For example, the intensity score 104 can apply a maximum intensity in a real-time fashion, but gradually reduce in intensity as time passes beyond with the intensity score 104 was received. Similarly, the evaluation component 102 can weight the intensity score 104 based upon a determination of how long the mobile device remained at the location 302 or how long the mobile device remained at the location 302 prior to transmitting an intensity score 104, which can relate to a further determination of the veracity of the intensity score 104. The evaluation component 102 can also interpret the intensity score 104 based upon a transaction associated with the entity 304, which can indicate, e.g., how much was spent at the location 302, what products or services were consumed or utilized, etc.

To make such a determination or inference, the evaluation component 102 can utilize a wide variety of information that can be included in the data store 306. For instance, the data store 306 can include entity data specific to the entity 304 as well as data generally related to the type of entity 304 (e.g. data related to restaurants). In addition, the data store can include intensity score histories that can be evaluated to aid in the determination or inference. For example, if past intensity scores typically relate only to one aspect of a particular type of entity, then the intensity score 104 can be weighted accordingly. Hence, if a particular mobile device 106 generally scores restaurants based only on the quality of food, a later intensity score 104 for a restaurant can be inferred to apply to the quality of food, but not necessarily to the quality of the service or the atmosphere.

Moreover, the data store 306 can further include demographic information associated with the mobile device 106 as well as aggregated demographics for many mobile devices 106. It is readily apparent however, that in other cases, the intensity score 104 can explicitly specify ratings for each of the categories individually. In such a case, the evaluation component 102 need make few or no inferences in interpreting the intensity score 104.

As another example, if the mapping component 112 determines that the location 302 is associated with a motion picture theatre (e.g. entity 304), then the evaluation component 102 can again access the data store 306 to facilitate interpretation of the intensity score 104. For instance, the data store 306 can include information employed by the tracking component 108 to ascertain the location of the mobile device 106. For example, depending upon the precision with which the tracking component 108 determined the location 302, it may be in some cases possible to identify not only the entity 304, but the particular auditorium of the mobile device 106. Hence, in conjunction with entity data stored in the data store 106 (e.g., film listings, times, layout, etc.) the intensity score 104 can be associated with a particular theatre as well as with a particular film. In accordance therewith, the intensity score 104 can be associated with disparate locations (e.g., other theatres showing the same film) in addition to the actual physical location of the mobile device 106.

It is to be appreciated that the above examples are intended to provide concrete examples, but are not intended to limit the claimed subject matter to merely the suggested examples. It is, of course, impossible to describe all the various embodiments, aspects, and/or features of the claimed subject matter as well as each and every type of data that can be included in the data store 306. Therefore, it should be understood that the data store 306 can include other types of data apart from what has been noted supra without departing from the spirit and scope of the claimed subject matter. In addition, the evaluation component 102 can employ any such data to facilitate interpretation of the intensity score 104.

In particular, the evaluation component 102 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g. naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 5:
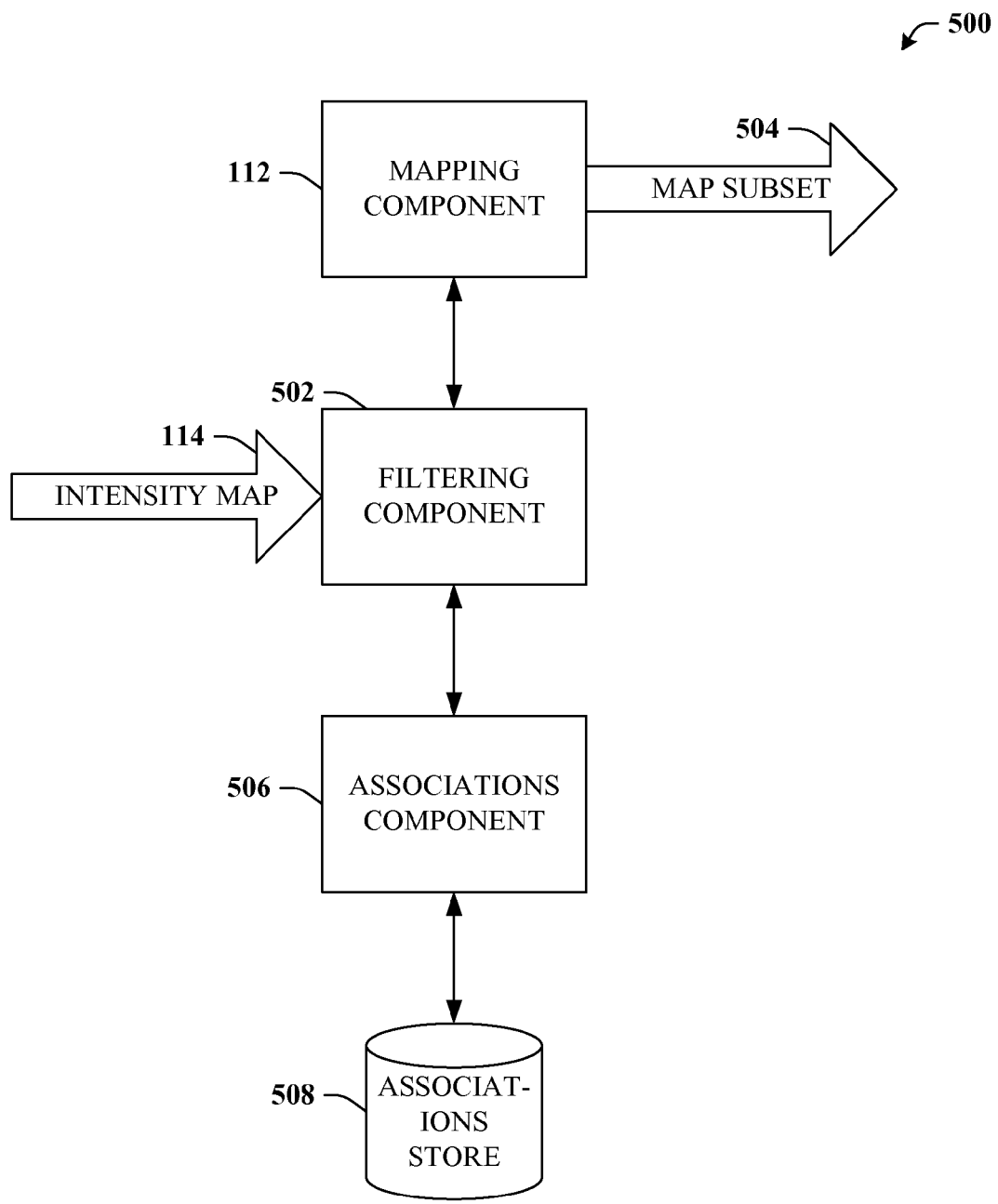
FIG. 5 is a block diagram of a computer-implemented system that can provide an intensity map to a requesting device.

With reference now to FIG. 5, a computer-implemented system 500 that can provide an intensity map to a requesting device can be found. In general, the system 500 can include the mapping component 112 that can, inter alia, associate a location of a mobile device with an entity as well as apply an intensity score to the intensity map 114 at coordinates defined by the location. In addition, the system 500 can also include a filtering component 502 that can receive the intensity map 114 as well as filter the intensity map 114 based upon a variety of criteria, several examples of which are described herein. Based upon the filtering or based upon other criteria, the mapping component 112 can provide to, e.g., a disparate requesting device (not shown) a subset 504 of the intensity map 114, described in more detail infra.

The system 500 can also include an associations component 506 that can manage associations between, e.g. the mobile device 106 and the requesting device. Association information can be included in an associations store 508, which can in some aspects be included in the data store 306, while in other aspects the associations store 508 can be a separate and distinct storage component. In particular, the associations store 508 can include data employed by email or messenger tools or other communications tools such as user profiles, contacts, calendars, organizers, friend lists, as well as demographic information they may or may not be included in the data store 306 described supra.

As mentioned, the associations component 506 can manage the associations between the mobile device 106 and the requesting device. As one example, the mobile device 106 that provides an intensity score 104 can choose to share the intensity score 104 (or other information such as location information 110) with only very specific third parties such as third parties included in a friend list. In a contrasting example, the mobile device 106 may choose to share the intensity score 104 (or other related statistics) with third parties (e.g., requesting devices) only if it is anonymous. As a third example, the mobile device 106 might prefer to share intensity score 104 as well as identification information with only specified third parties such as those on a friend list or a subset of a friend list, but be anonymous to all other requesting devices.

On the other hand, the requesting device (e.g., as opposed to the mobile device 106 that provides the intensity score 104) might only be interested in an intensity map 114 populated with intensity scores 104 from very particular parties, which can again stem from a friend list or the like, or intensity scores 104 that relate to a particular entity or type of entity. For example, a user of the requesting device may want to find a restaurant. In accordance therewith, the requesting device can request an intensity map 114 of a city or a particular portion of a city (e.g., a portion in proximity to the current location of the requesting device) that pertain to restaurants. The filtering component 502 can filter the intensity map 114 based upon the type of entity, which in this case is restaurants. Moreover, the filtering component 502 can filter the intensity map 114 based upon more detailed information such as restaurants that serve Italian food or some other class, as well as based upon an association such as restaurants currently occupied by members of a friend list.

In the latter case, in the event that the intensity map 114 (or map subset 504) is sparsely populated, the requesting device can request an intensity map 114 (or map subset 504) illustrating second degree associations such as friends of friend (e.g. two degrees of separation: members of a friend list that belong to one or more members of the requesting device's friend list). Naturally, the associations component 506 can extend the associations to a third degree association and so on. It is also to be appreciated that the associations need not be limited to friend lists, but can, especially in the case of anonymous intensity scores 104, be based upon demographic information and/or profiling. For instance, the requesting device can request an intensity map for single persons between the ages of 25 and 35, which can be, but need not be, further filtered based upon a type of entity or a particular area.

In any case, the associations component 506 can manage the associations such that intensity scores 104 provided by mobile devices 106 are as protected as is required and/or warranted by maintaining anonymity or limiting all or portions of the information to trusted sources (e.g., a friend list) as dictated by the mobile device 106 and/or the user of the mobile device 106. Similarly, the filtering component 502 can ensure that the requesting device receives substantially relevant results based upon its own set of trusted sources, queries, and/or preferences.

Figure 6:
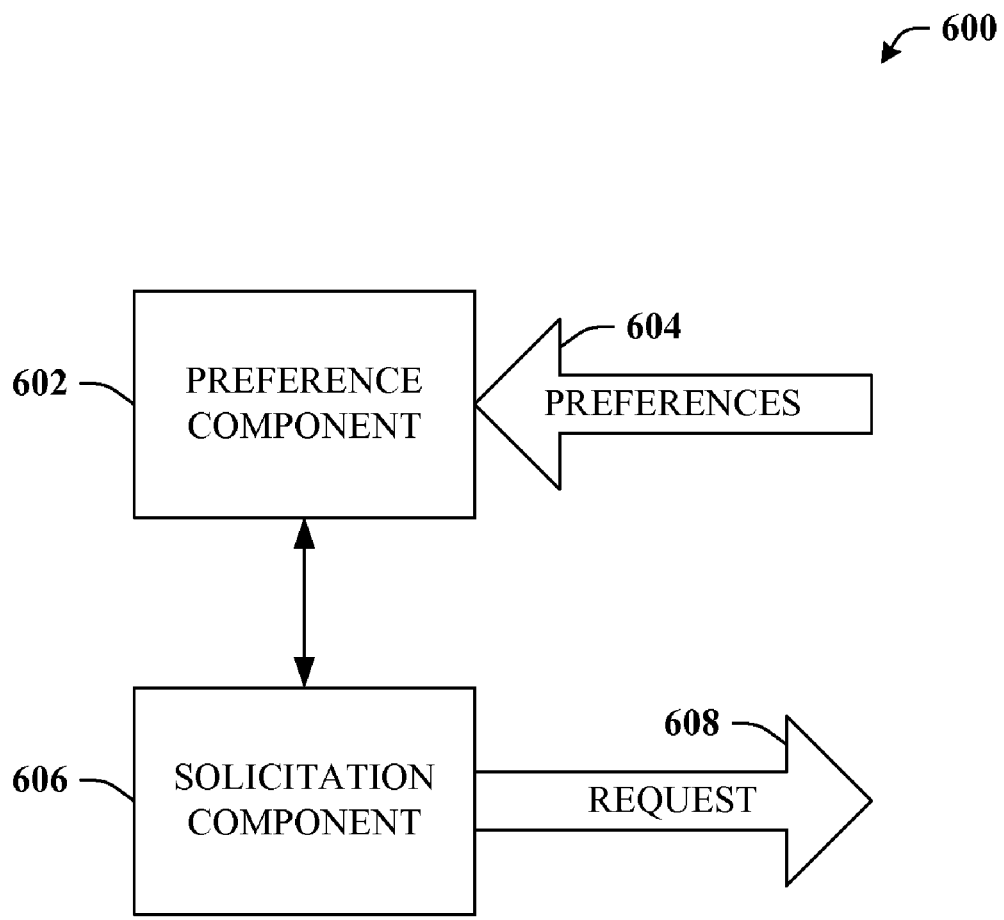
FIG. 6 is a block diagram of a computer-implemented system that can receive an intensity map.

Turning now to FIG. 6, a computer-implemented system 600 that can receive an intensity map is depicted. Generally, the system 600 can include a preference component 602 that aggregates user preferences 604. Typically, the preferences 604 relate to aspects of the intensity map and/or aspects directed to a request 608 for or a formatting for the intensity map, some of which are described in more detail in connection with FIG. 7. In addition, the system 600 can also include a solicitation component 606 that can transmit to a remote system (not shown) the request 608 for an intensity map, wherein the request 608 is based upon the user preferences 604.

Figure 7:
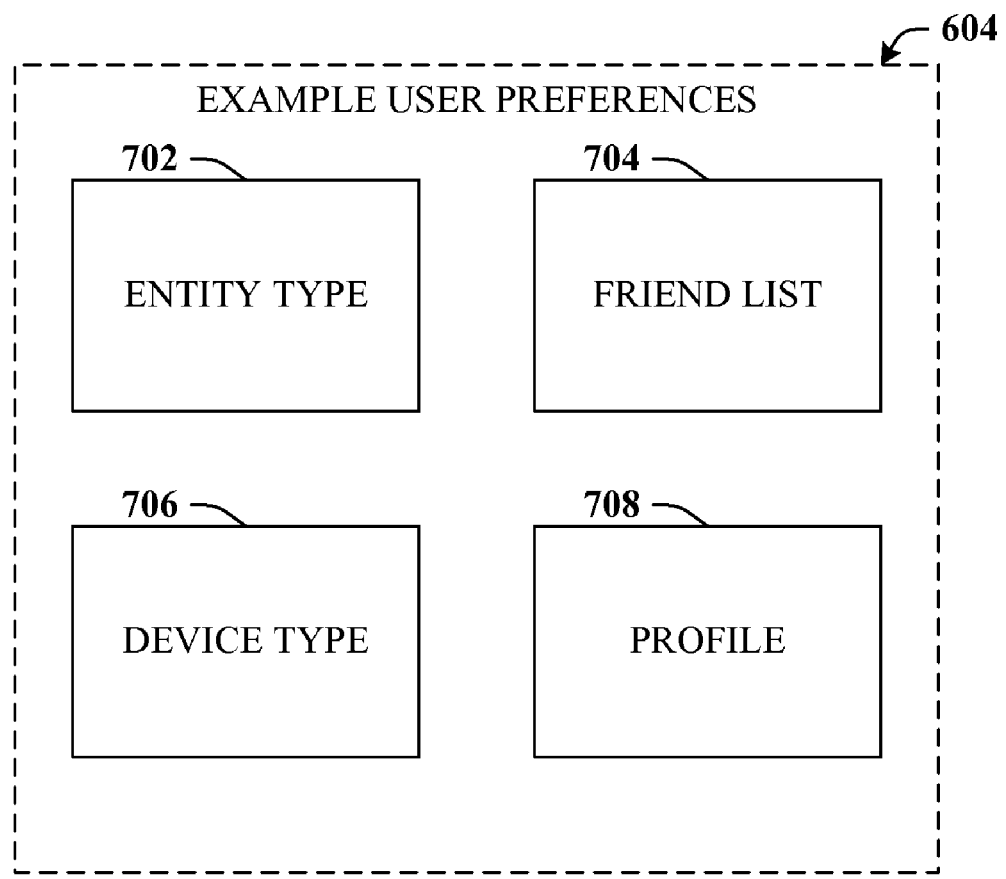
FIG. 7 illustrates a block diagram illustrating various examples of user preferences.

While still referring to FIG. 6, but turning as well to FIG. 7, a block diagram of example user preferences 604 is illustrated. It is to be appreciated that the forthcoming examples are intended to exemplary rather than limiting the claimed subject matter. As a first example, the user preference 604 can include an entity type 702. For example, the request 608 can be a request for an intensity map that relates specifically to one type of entity such as a restaurant or, even more specifically, an Italian restaurant.

In addition, the preferences 604 can include a friend list 704 which can include any of a set or subset of friends, contacts, colleagues, family relations, acquaintances, or other associations, any or all of which can be based upon and/or extracted from one or more contact lists associated with a disparate application or service such as an email client or a chat or service.

Another example is provided by device type 706. Many features of the request 608 can depend upon the type of device requesting the intensity map such as user interface options (e.g., display size, resolution, formatting, etc.) or other hardware features (e.g., memory, processor, bandwidth), as well as device software (e.g., loaded applications). Additionally, the preferences 604 can include a user and/or device profile 708 that can include common or historical behavior, demographic data, privacy settings, or the like.

Figure 8:
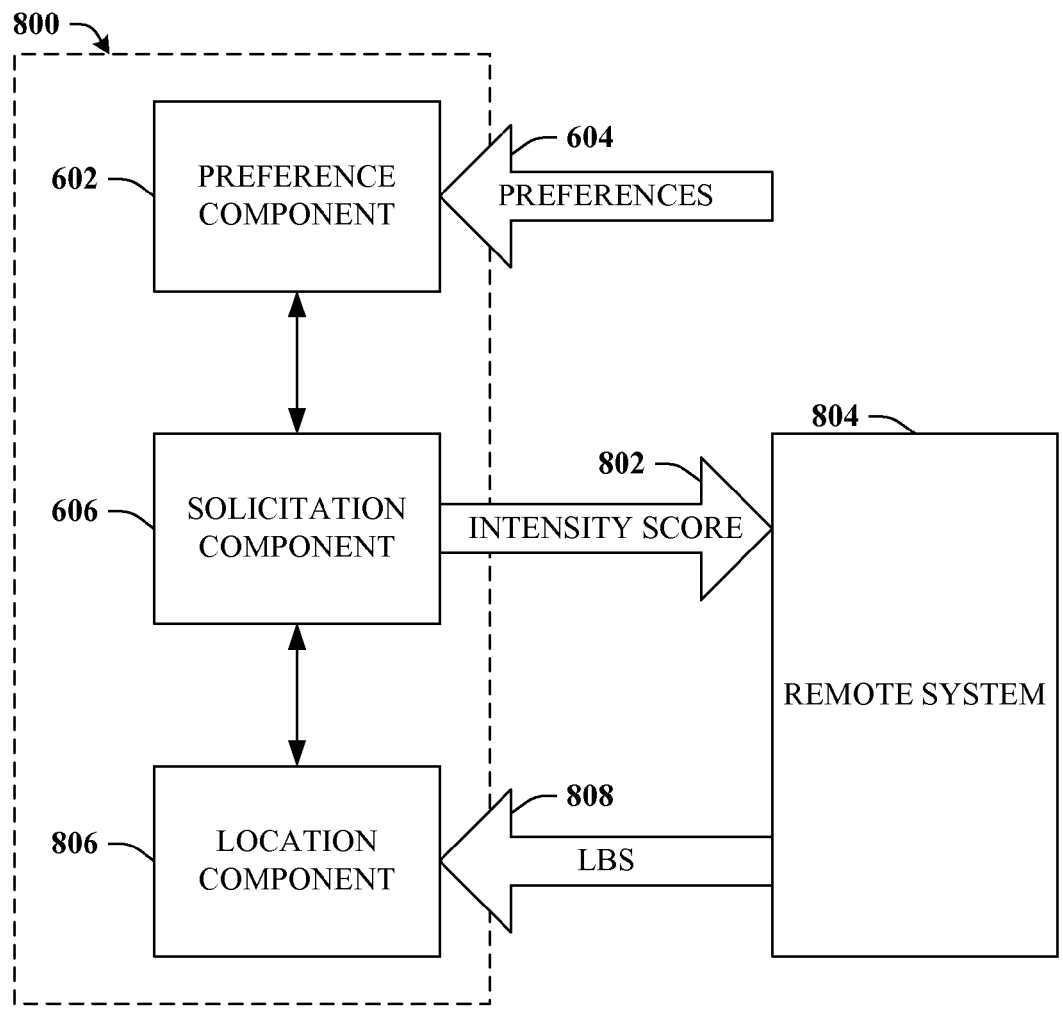
FIG. 8 depicts a block diagram of a computer-implemented system that can deliver an intensity score to and/or receive an LBS from a remote system.

Referring now to FIG. 8, a computer-implemented system 800 that can deliver an intensity score to and/or receive an LBS from a remote system is illustrated. Typically, the system 800 can include the preference component 602 that can aggregate user preferences 604 as well as the solicitation component 606 that can transmit to a remote system 804 a request (not shown) for an intensity map. In addition, the solicitation component 606 can transmit to the remote system 804 an intensity score 802. The intensity score 802 can be based upon an assessment of a local environment with respect to the system 800 and can be as broad or as granular as desired.

For example, the intensity score 802 can very broadly indicate whether the local environment is hot or not with a very simple yes/no approval intensity score 802. While simple, such an intensity score 802 can be quickly and conveniently selected even by devices with limited user interface features. As another example, the intensity score 802 can be represented by a value from 0-9, which provides many more discrete values, but can typically still be conveniently selected with, e.g. a single keystroke input to common mobile devices. In addition, the intensity score 802 can include very detailed information as well, such as categorical assessments, additional comments, qualifications, or the like and can even include media attachments such as images, audio, video, etc.

The system 800 can also include a location component 806 that can receive a LBS 808 from the remote system 804. It is to be appreciated that the LBS can be received in return for providing the intensity score 802. The LBS 808 can be substantially any location-based service such as an indication of a current location, mapping or tracking services, product, service, or business listings, proximal and/or location-based advertisements, current locations of third parties (e.g., members of a friend list), and so forth. It is also to be appreciated that the intensity score 802 and the LBS 808 need not both relate to the same location. Moreover, the intensity score 802 and the LBS 808 need not be provided during a single transaction.

Figure 9:
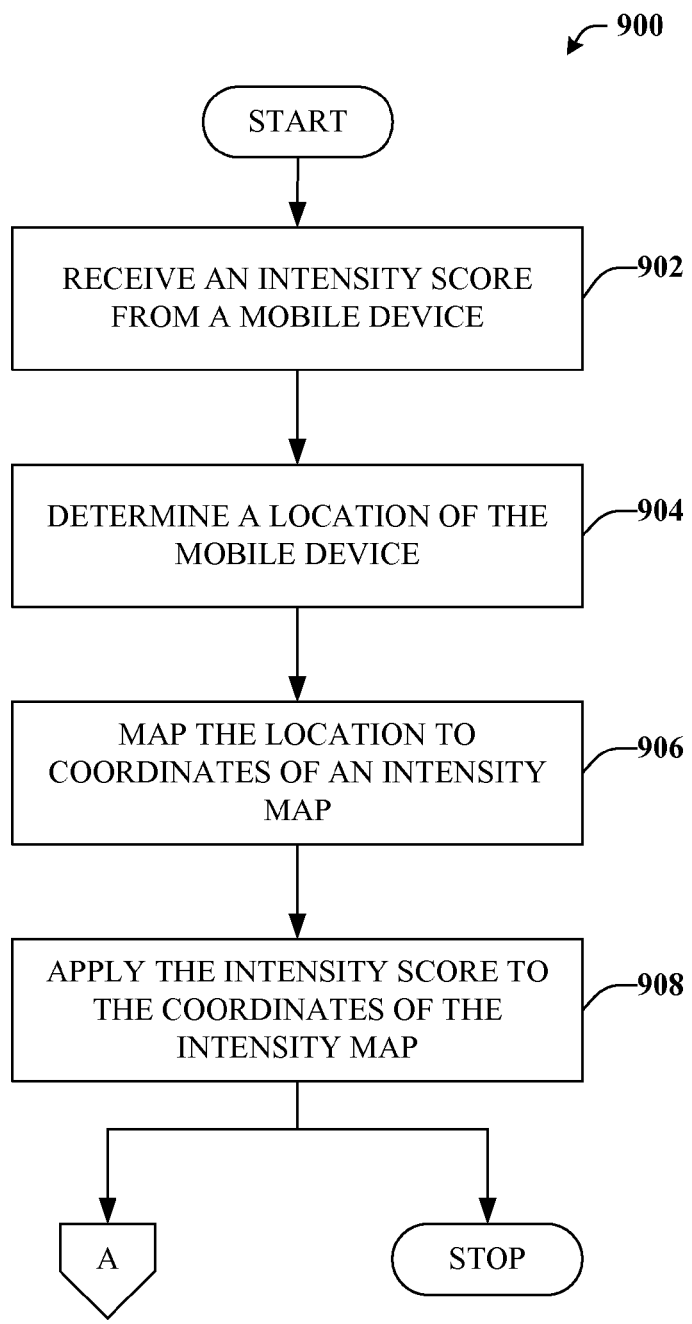
FIG. 9 is an exemplary flow chart of procedures that define a computer implemented method for generating an intensity map.
Figure 10:
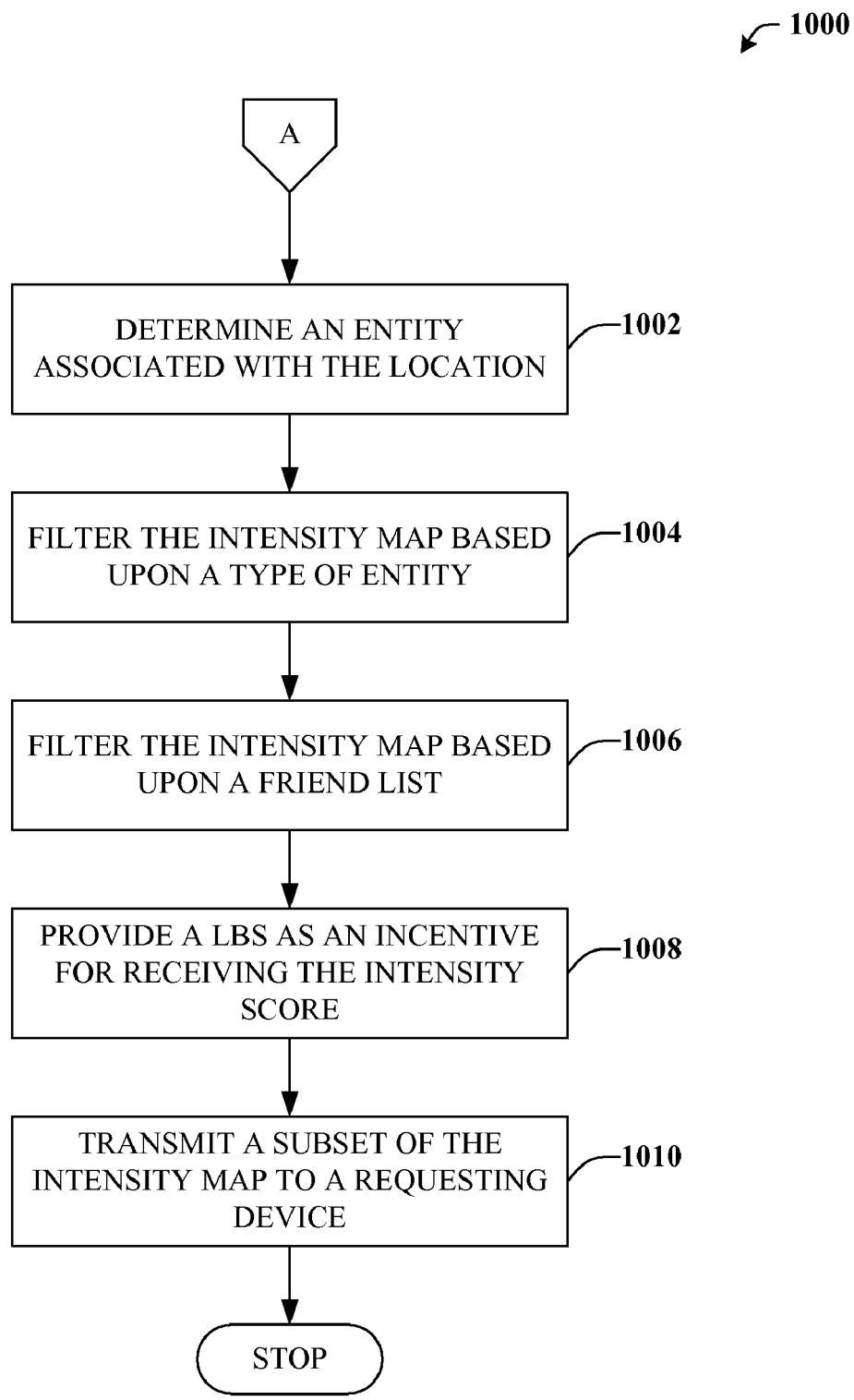
FIG. 10 is an exemplary flow chart of procedures that define a computer implemented method for providing additional features associated with generating an intensity map.

FIGS. 9 and 10 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 9, an exemplary computer implemented method 900 for generating an intensity map is illustrated. Generally, at reference numeral 902, an intensity score can be received from a mobile device. The intensity score typically relates to an assessment of an environment, establishment, or entity local to the mobile device and can be single binary digit representing either approval or dissatisfaction; a multi-category, multimedia review of many aspects of the environment, establishment, or entity; or virtually anything in between. At reference numeral 904, a location of the mobile device can be determined. It is to be appreciated that the intensity score can include the location of the mobile device, however, the location can be determined in other ways as well. For example, the location can be established by way of GPS, WAP, radiolocation, proximity to transceivers, assessment of signal strength, as well as numerous other examples.

At reference numeral 906, the location determined at act 904 can be mapped to coordinates of an intensity map. For example, the intensity map can be a global map with discrete coordinates of the map that correspond to any given physical location and at any suitable scale and/or resolution. The intensity map can also be representative of a particular region or area associated with the mobile device. At reference numeral 908, the intensity score can be applied to the intensity map at the coordinates mapped at act 906. It is to be appreciated that the intensity score can be applied in either a weighted or an unweighted fashion. For example, all intensity scores for particular coordinates can be averaged to produce the intensity at those coordinates. Additionally, or alternatively, certain intensity scores can carry more weight than other scores based upon a variety of factors such as scoring histories, the quality and/or level of detail of the intensity scores, a level of service, demographic data, or many other factors.

With reference now FIG. 10, an exemplary computer implemented method 1000 for providing additional features associated with generating an intensity map is depicted. In general, at reference numeral 1002, an entity associated with the location can be determined. The entity can be, inter alia, a residence and/or an establishment or place of business, a commercial or public venue, as well as particular types of establishments. The location can be associated with the entity based upon mapping or directory products or services that can be accessed by way of one or more data stores.

At reference numeral 1004, the intensity map can be filtered based upon a type of entity. For example, the intensity map that can, e.g., show aggregated intensity scores for various coordinates of the map can be filtered to display such aggregated intensity scores only for one or more of, say, restaurants, clubs, parks, or some other entity. Likewise, at reference numeral 1006, the intensity map can be filtered based upon a friend list or some other type of association. For instance, the intensity map can be configured to display intensity scores only from members of a friend list, wherein it is to be appreciated that the friend list can be in the first degree, second degree (e.g., friends of friends), third degree, and so on.

At reference numeral 1008, a LBS can be provided as an incentive to encourage receiving the intensity score. It is to be understood that the LBS can be access to location information including but not limited to a current location of the mobile device, a current location of other mobile devices that maintain an association to the mobile device (e.g. mobile devices of friends, family, and/or colleagues), nearby entities, nearby advertisements or incentives, etc. It is also to be understood that the LBS and the intensity score need not relate to the same location or entity and need not be exchanged in a one-to-one ratio or even in temporal proximity to one another. For example, a mobile device can periodically provide intensity scores, e.g., at the behest or whim of the user, and then at a much later time request an LBS, which can be provided by a remote system. At reference numeral 1010, a subset of the intensity map can be transmitted to a requesting device. The subset can be only a portion of the geographic area represented by the intensity map such as a particular region or locale. Additionally or alternatively, the subset can be based upon one or more acts of filtering, such as filtering based upon an entity type or filtering based upon an association.

Figure 11:
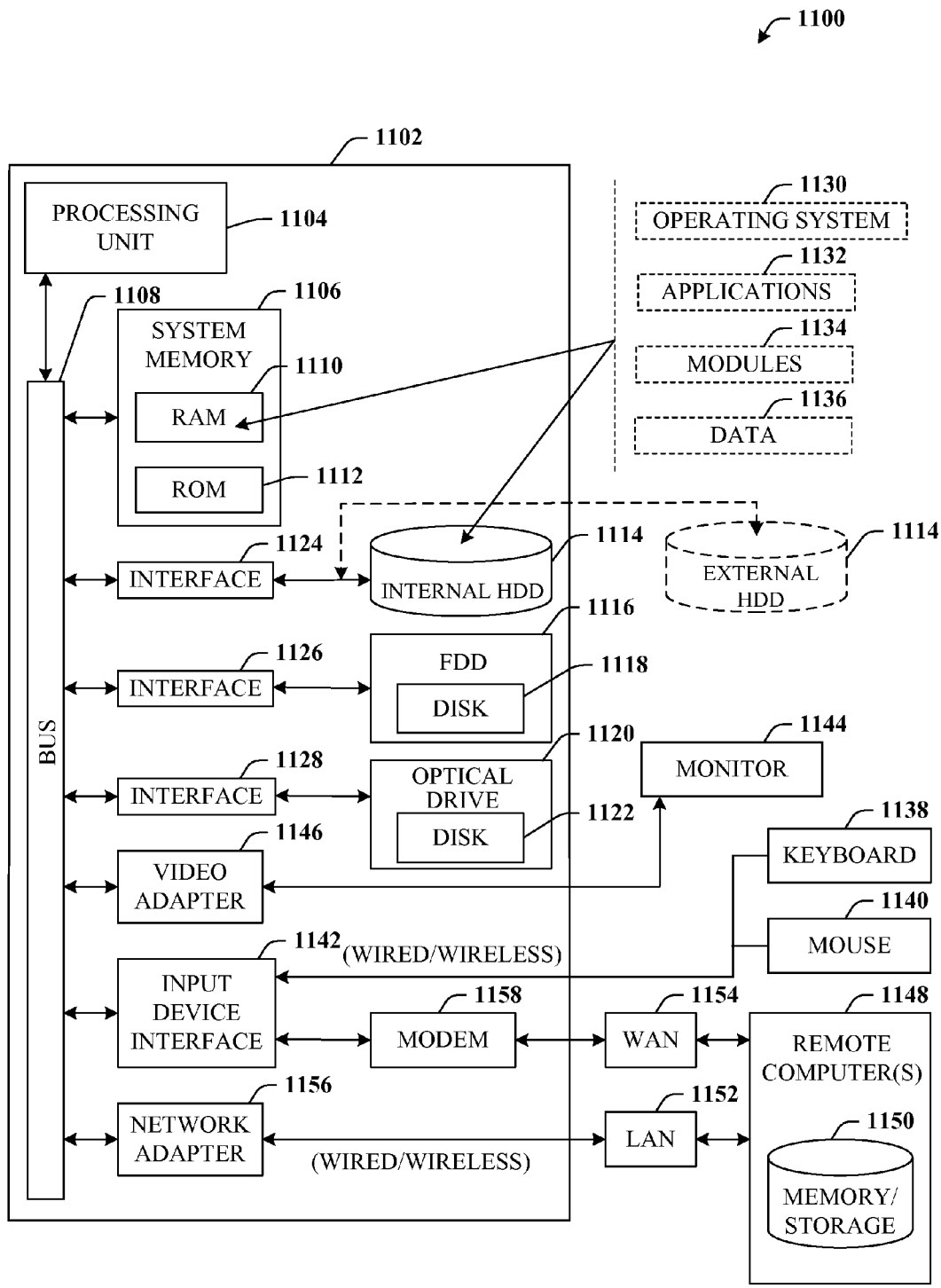
FIG. 11 illustrates a block diagram of a computer operable to execute the disclosed architecture.

Referring now to FIG. 11, there is illustrated a block diagram of an exemplary computer system operable to execute the disclosed architecture. In order to provide additional context for various aspects of the claimed subject matter, FIG. 11 and the following discussion are intended to provide a brief, general description of a suitable computing environment 1100 in which the various aspects of the claimed subject matter can be implemented. Additionally, while the claimed subject matter described above can be implemented in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects of the claimed subject matter includes a computer 1102, the computer 1102 including a processing unit 1104, a system memory 1106 and a system bus 1108. The system bus 1108 couples to system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE1394 interface technologies. Other external drive connection technologies are within contemplation of the claimed subject matter.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the claimed subject matter can be implemented with various commercially available operating systems or combinations of operating systems.

A user can enter commands and information into the computer 1102 through one or more wired/wireless input devices, e.g. a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g. a wide area network (WAN) 1154. Such LAN and WAN networking environments are commonplace in offices and companies, and facilitate enterprise-wide computer networks, such as intranets, all of which may connect to a global communications network, e.g. the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 11BaseT wired Ethernet networks used in many offices.

Figure 12:
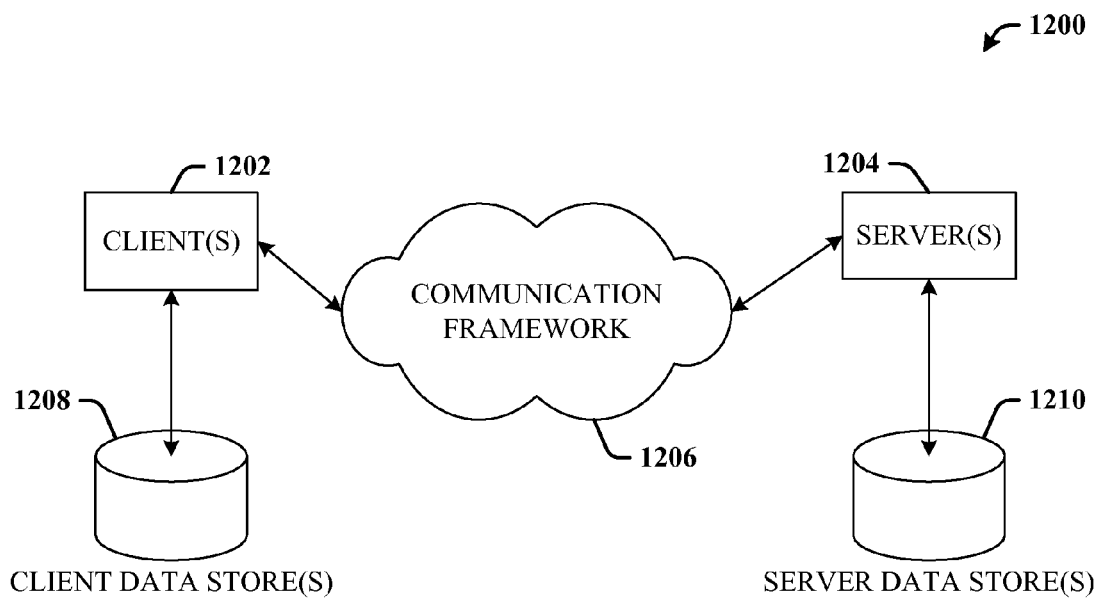
FIG. 12 illustrates a schematic block diagram of an exemplary computing environment.

Referring now to FIG. 12, there is illustrated a schematic block diagram of an exemplary computer compilation system operable to execute the disclosed architecture. The system 1200 includes one or more client(s) 1202. The client(s) 1202 can be hardware and/or software (e.g., threads, processes, computing devices). The client(s) 1202 can house cookie(s) and/or associated contextual information by employing the claimed subject matter, for example.

The system 1200 also includes one or more server(s) 1204. The server(s) 1204 can also be hardware and/or software (e.g., threads, processes, computing devices). The servers 1204 can house threads to perform transformations by employing the claimed subject matter, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g. a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer-implemented system that creates an intensity map, comprising:
    a processing device; and
    one or more components operating in conjunction with the processing device, the one or more components comprising:
        an evaluation component that receives an intensity score from a mobile device, the intensity score being a rating of variable scale that indicates various levels of interest, the evaluation component to gradually reduce the intensity score as time from when the intensity score is received gradually increases;
        a tracking component that determines a location of the mobile device, exchanges location information with the mobile device, and provides a location based service (LBS) to the mobile device; and
        a mapping component that aggregates the intensity score to an intensity map for a particular geographic location, the intensity map being configured to reflect intensity scores for the particular geographic location using coding that reflects varying degrees of correlation across the particular geographic location to interests of the user of the mobile device.

2. The system of claim 1, wherein the tracking component employs at least one of a Global Positioning System (GPS) or a Wireless Application Protocol (WAP) to determine the location of the mobile device.

3. The system of claim 1, wherein the tracking component provides a Location-Based Service (LBS) to the mobile device in exchange for the intensity score.

4. The system of claim 1, wherein the mapping component associates the location with an entity.

5. The system of claim 4, wherein the evaluation component interprets the intensity score based upon a type of the entity.

6. The system of claim 4, wherein the evaluation component interprets the intensity score based upon at least one of a time in which the mobile device remains at the location or a transaction associated with the entity.

7. The system of claim 1, further comprising a filtering component that filters the intensity map based upon a type of entity.

8. The system of claim 1, wherein the intensity map is a global map.

9. The system of claim 1, wherein the mapping component provides a subset of the intensity map to a requesting device.

10. The system of claim 9, further comprising an association component that manages associations between the mobile device and the requesting device.

11. The system of claim 10, further comprising a filtering component that filters the intensity map based upon the associations.

12. The system of claim 10, wherein the association component employs a friend list to manage the associations.

13. The system of claim 10, wherein the association component employs a second degree friend list to manage the associations.

14. A computer-implemented system that receives an intensity map, comprising:
    a processing device; and
    one or more components operating in conjunction with the processing device, the one or more components including:
        a preference component that aggregates user preferences and filtering criteria;
        a solicitation component that transmits to a remote system a request for an intensity map that is generated based upon the user preferences and filtered according to the filtered criteria, the solicitation component to receive the intensity map that is filtered according to the filtering criteria such that the intensity map shows an intensity score for an entity when (1) the intensity score is inputted by an individual on a friend list and (2) the individual on the friend list that inputted the intensity score is currently present at the entity.

15. The system of claim 14, wherein the user preferences indicate a type of entity.

16. The system of claim 14, wherein the user preferences include the friend list.

17. The system of claim 14, wherein the solicitation component further transmits an intensity score to the remote system that is based upon an assessment of a local environment within the geographic location.

18. The system of claim 17, further comprising a location component that receives a LBS from the remote system in return for the intensity score.

19. A computer-implemented method for generating an intensity map, comprising:
    receiving one or more intensity scores from a mobile device;
    associating the received one or more intensity scores with preferences of a user of the mobile device;
    determining a location of the mobile device;
    mapping the location to coordinates of an intensity map;
    applying the one or more intensity scores to the coordinates of the intensity map;
    receiving a request for an intensity map that is based on a set of user preferences, the request stipulating that the intensity map be generated for a zip code;
    receiving the set of user preferences in addition to the request; and generating the requested intensity map by aggregating the one or more intensity scores related to the zip code that share commonalities with the set of user preferences, the intensity map reflecting the aggregates of intensity scores using color-coding configured to reflect a greater and lesser degree of correlation for the zip code to the user preferences, the color-coding being updated in real-time or near real-time based on newly received intensity scores originating from mobile devices used by users having preferences that correlate with the set of user preferences.

20. The method of claim 19, further comprising:
determining an entity associated with the location;
filtering the intensity map based upon a type of entity;
filtering the intensity map based upon a friend list;
providing a LBS as an incentive for receiving the intensity score; and
transmitting a subset of the intensity map to a requesting device.

* * * * *

UNITED STATES PATENT AND TRADEMARK OFFICE
CERTIFICATE OF CORRECTION

PATENT NO. : 8,185,137 B2  
APPLICATION NO. : 11/767715  
DATED : May 22, 2012  
INVENTOR(S) : Berns et al.

Page 1 of 1

It is certified that error appears in the above-identified patent and that said Letters Patent is hereby corrected as shown below:

In Title page, in field (75), under "Inventors" column 1, line 3, delete "Nicholas C. Baker," and insert -- Nicholas R. Baker, --, therefor.

Signed and Sealed this
Sixth Day of November, 2012

David J. Kappos
*Director of the United States Patent and Trademark Office*